US012606454B2

(12) United States Patent
Kim et al.

(10) Patent No.: US 12,606,454 B2
(45) Date of Patent: Apr. 21, 2026

(54) METHOD OF CONTROLLING CRYSTALLOGRAPHIC ARRANGEMENT IN MESOCRYSTALS

(71) Applicant: KOREA UNIVERSITY RESEARCH AND BUSINESS FOUNDATION, Seoul (KR)

(72) Inventors: Young Keun Kim, Seoul (KR); Bum Chul Park, Seoul (KR); Min Jun Ko, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 859 days.

(21) Appl. No.: 17/851,228

(22) Filed: Jun. 28, 2022

(65) Prior Publication Data

US 2022/0411279 A1     Dec. 29, 2022

(30) Foreign Application Priority Data

Jun. 28, 2021     (KR) ........................ 10-2021-0084318

(51) Int. Cl.
    *C01G 49/02*     (2006.01)
    *B82Y 40/00*     (2011.01)
(52) U.S. Cl.
    CPC .............. *C01G 49/02* (2013.01); *B82Y 40/00* (2013.01); *C01P 2002/60* (2013.01); *C01P 2004/64* (2013.01)
(58) Field of Classification Search
    CPC ........ C01G 49/02; C01G 49/08; B82Y 40/00; B82Y 30/00; B82Y 5/00; C01P 2002/60;
    C01P 2004/64; C01P 2002/78; C01P 2004/04; C01P 2004/45; C01P 2004/51; C01P 2004/52; C01P 2004/62; C01P 2006/42; B82B 3/0061; B82B 1/005; B82B 3/0009
    See application file for complete search history.

(56) References Cited

PUBLICATIONS

Shouhu Xuan, Yi-Xiang J. Wang, Jimmy C. Yu, Ken Cham-Fai Leung, Tuning the Grain Size and Particle Size of Superparamagnetic Fe3O4 Microparticles, Oct. 13, 2009, Chem. Mater., vol. 21, No. 21, 5079-5087 (Year: 2009).*
Xuan et al., "Tuning the Grain Size and Particle Size of Superparamagnetic Fe3O4 Microparticles." Oct. 13, 2009, Chem. Mater., vol. 21, No. 21, 5079-5087 (Year: 2009).*
Xuan, Shouhu, et al. "Tuning the Grain Size and Particle Size of Superparamagnetic $Fe_3O_4$ Microparticles." Chemistry of Materials 21.21 (2009): 5079-5087.
Park, Bum Chul, et al. "Strategy to control magnetic coercivity by elucidating crystallization pathway-dependent microstructural evolution of magnetite mesocrystals." Nature communications 11.1 (2020): (10 pages).

* cited by examiner

*Primary Examiner* — Daniel Berns
*Assistant Examiner* — Joshua Maxwell Speer
(74) *Attorney, Agent, or Firm* — NSIP Law

(57)     ABSTRACT

The present invention relates to a method of controlling the arrangement of building block nanocrystals in iron oxide mesocrystals by controlling the type of surface ligand, the method including mixing an iron ion precursor and a surface ligand. The present invention can provide nanoparticles having different magnetic properties by controlling the crystallographic arrangement of building block nanocrystals in mesocrystals according to surface ligands.

6 Claims, 5 Drawing Sheets

METHOD OF CONTROLLING CRYSTALLOGRAPHIC ARRANGEMENT IN MESOCRYSTALS

1. FIELD OF THE INVENTION

Figure 1:
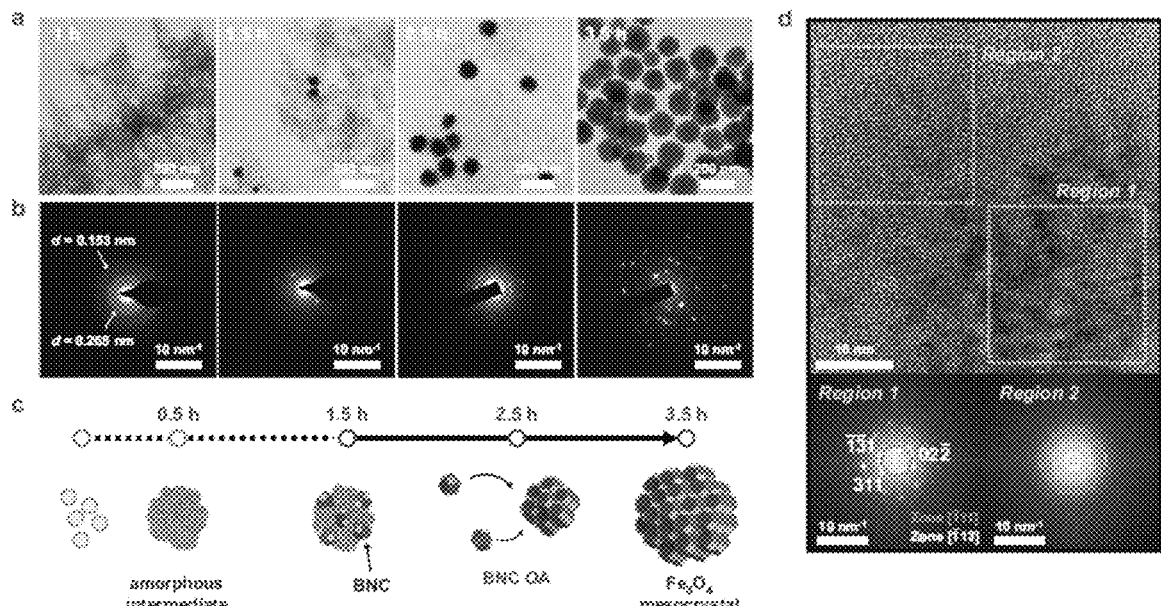

The present invention relates to a method of controlling the arrangement of building block nanocrystals in iron oxide mesocrystals, iron oxide mesocrystals with controlled arrangement, and a method of preparing such iron oxide mesocrystals.

2. DISCUSSION OF RELATED ART

Nanoparticles with magnetic properties are attracting attention in the nano-medical field, such as biosensors for diagnosing diseases, thermotherapy, drug delivery systems, and magnetic resonance imaging agents. In order to obtain high efficiency in the above-mentioned application fields, many studies have been conducted on the control of properties of magnetic nanoparticles. Among them, mesocrystals are new forms of nanoparticles in which identifiable building block nanocrystals are assembled in the same crystal direction, and many studies have been made on the characteristics, size-dependent characteristics of the building block nanocrystal material, as well as the collective characteristics resulting from interactions between the building block nanocrystals.

These mesocrystals are produced by regularly tiling building block nanocrystals, and in this process, oriented attachment (OA), in which the building block nanocrystals are attached to each other in a specific crystallographic order and crystal growth proceeds, is gaining attention as a new model describing the production of crystallographically arranged structures, and currently the mesocrystals are mainly formed by the oriented attachment process.

However, the exact reason for oriented attachment or how to control it has not yet been identified, and therefore only mesocrystals aligned in the same direction have been reported.

Therefore, there is a need for a technology capable of designing nanoparticles with magnetic properties based on understanding the reason for oriented attachment and a technique for controlling the crystallographic arrangement by oriented attachment.

SUMMARY OF THE INVENTION

The present invention seeks to provide a method of controlling the arrangement building block nanocrystals in a mesocrystal based on the mechanism of mesocrystal synthesis through an oriented attachment process and, based on this, flexibly control the magnetic properties to design a customized material for application fields.

In addition, the present invention seeks to provide a method of preparing a mesocrystal with a controlled arrangement according to such method.

Means to Solve the Problem

The present invention provides a method of controlling the arrangement of building block nanocrystals in an iron oxide mesocrystal by controlling the type of surface ligand, the method including mixing an iron ion precursor and a surface ligand.

In addition, the present invention provides a method of preparing an iron oxide mesocrystal in which iron oxide building block nanocrystals having a controlled arrangement by controlling the types of surface ligand are assembled, the method including mixing an iron ion precursor and a surface ligand.

In addition, the present invention provides an iron oxide mesocrystal in which iron oxide building block nanocrystals whose arrangement is controlled by the above method are assembled.

Effects of the Invention

According to the present invention, the arrangement of the building block nanocrystals in a mesocrystal can be controlled by controlling the surface ligand attached to the surface of building block nanocrystal. By adjusting the arrangement of the building block nanocrystals, the building block nanocrystals can be arranged in the same direction or randomly, thereby exhibiting different magnetic properties. For example, when aligned in the same direction, it exhibits strong magnetism, and when aligned randomly, it exhibits superparamagnetic properties with weak interactions between building block nanocrystals and is applicable to a variety of applications requiring different magnetic properties.

Figure 2:
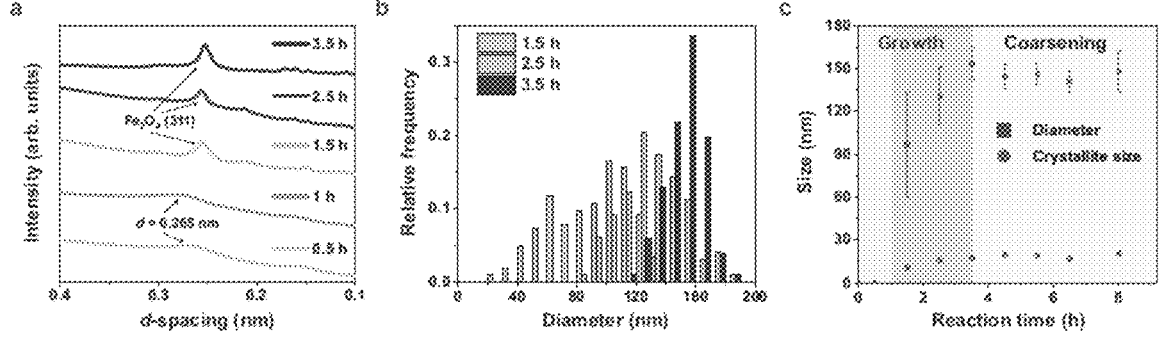
Figure 3:
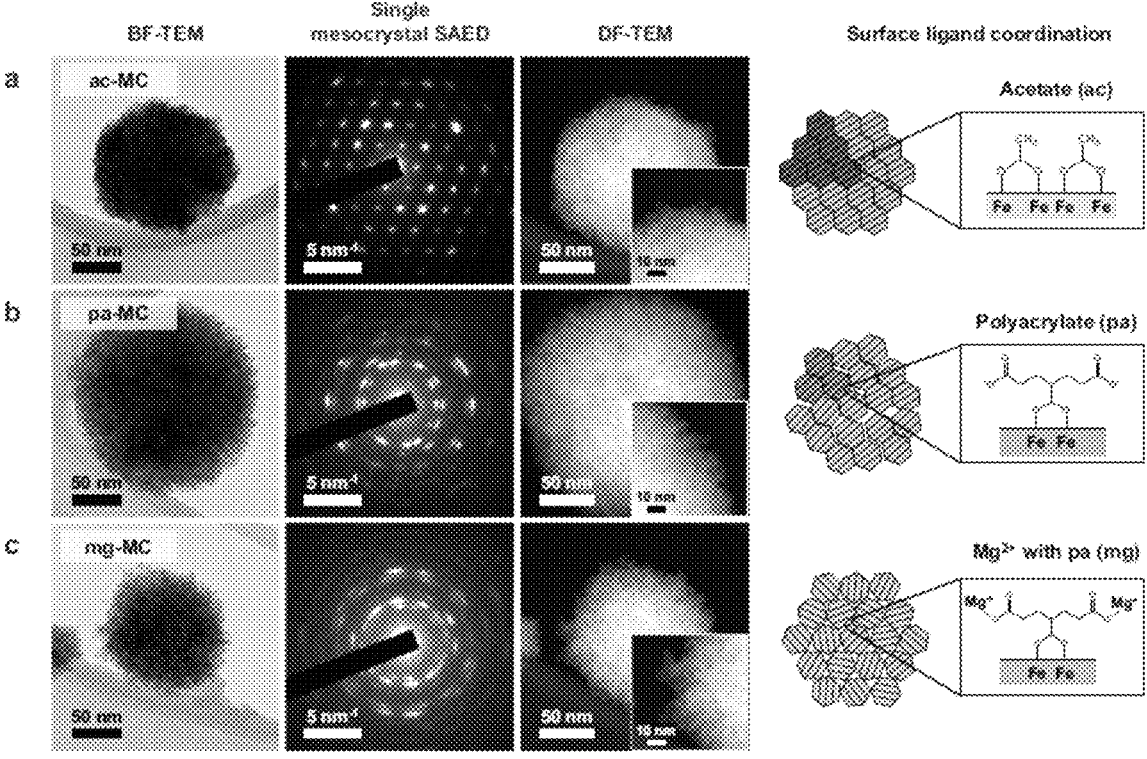
Figure 4:
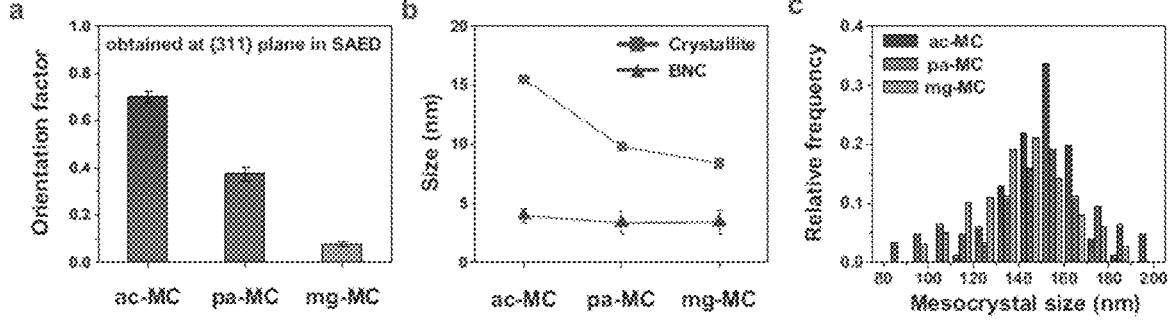
Figure 5:
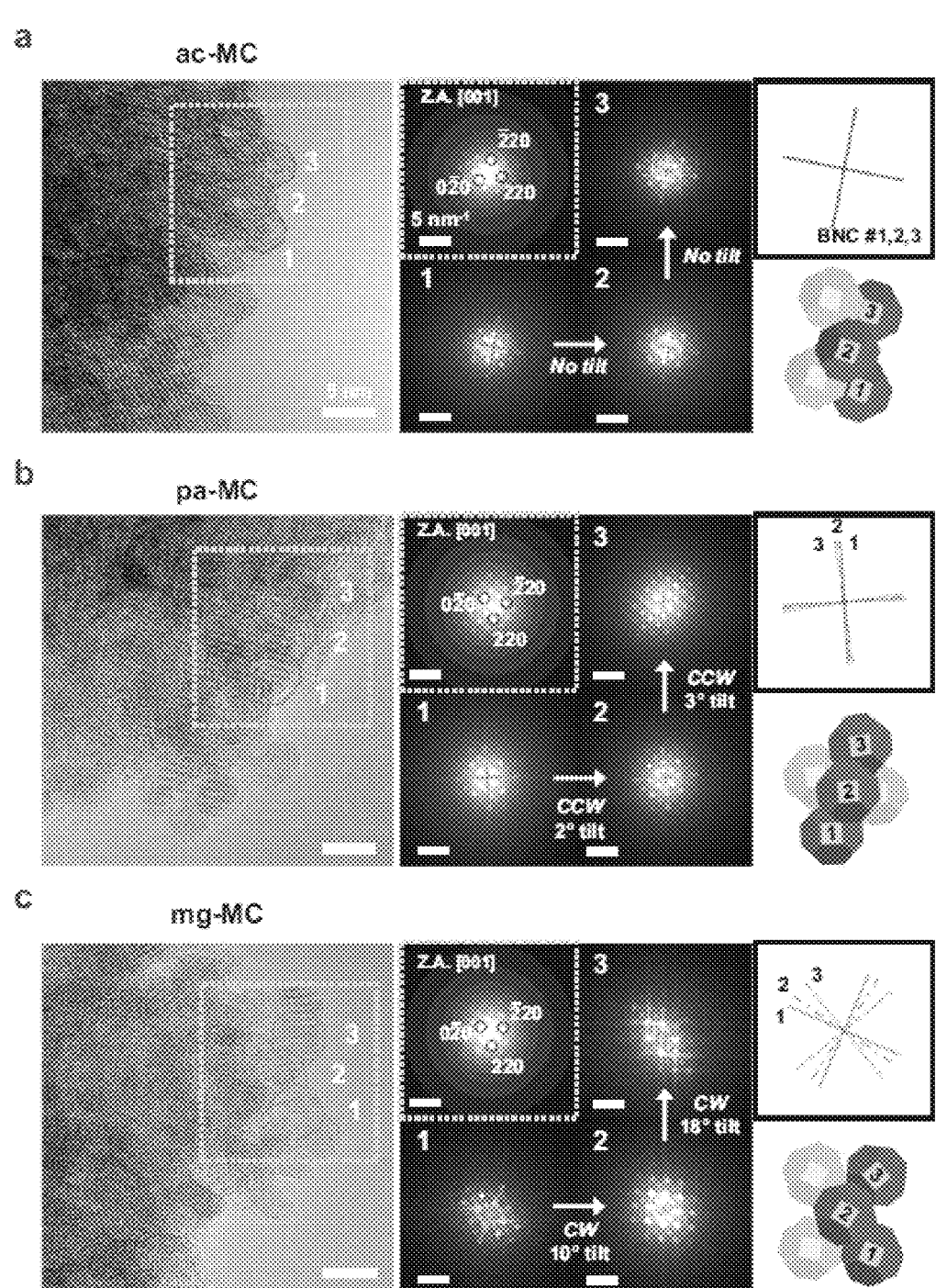
Figure 6:
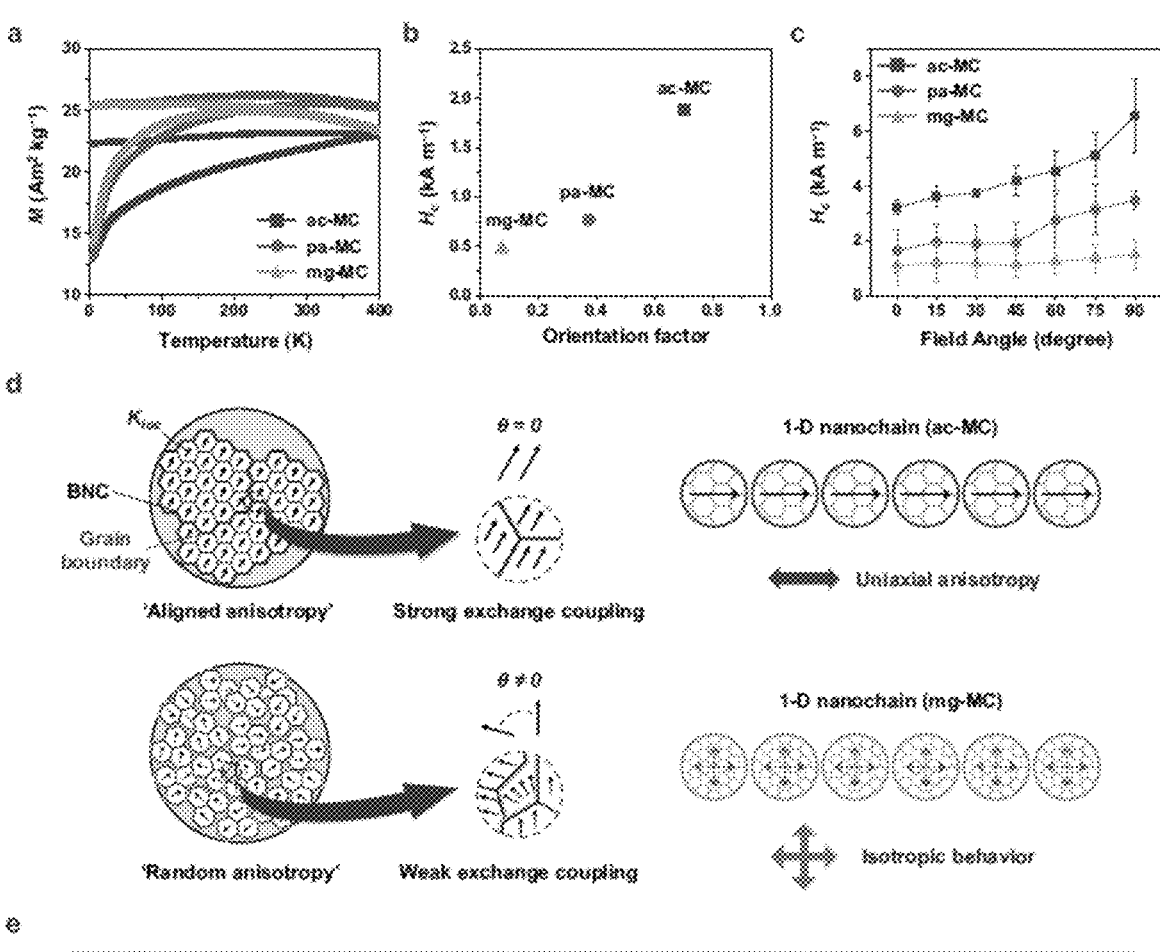
Figure 6:
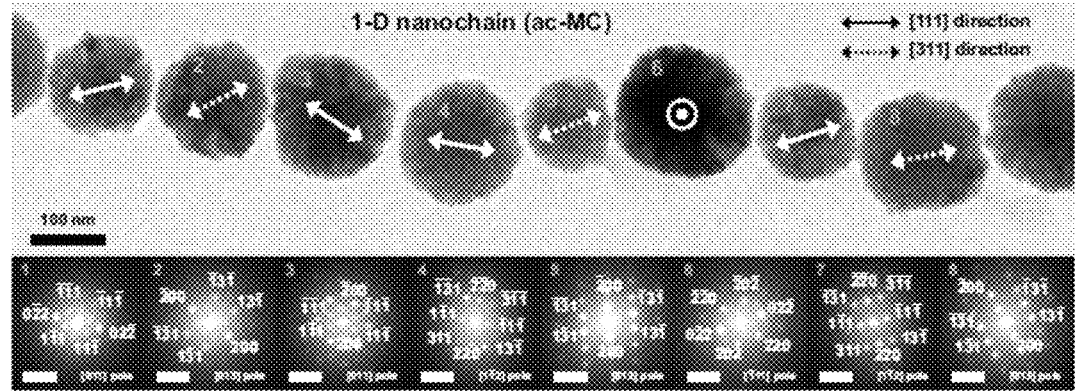
Figure 7:
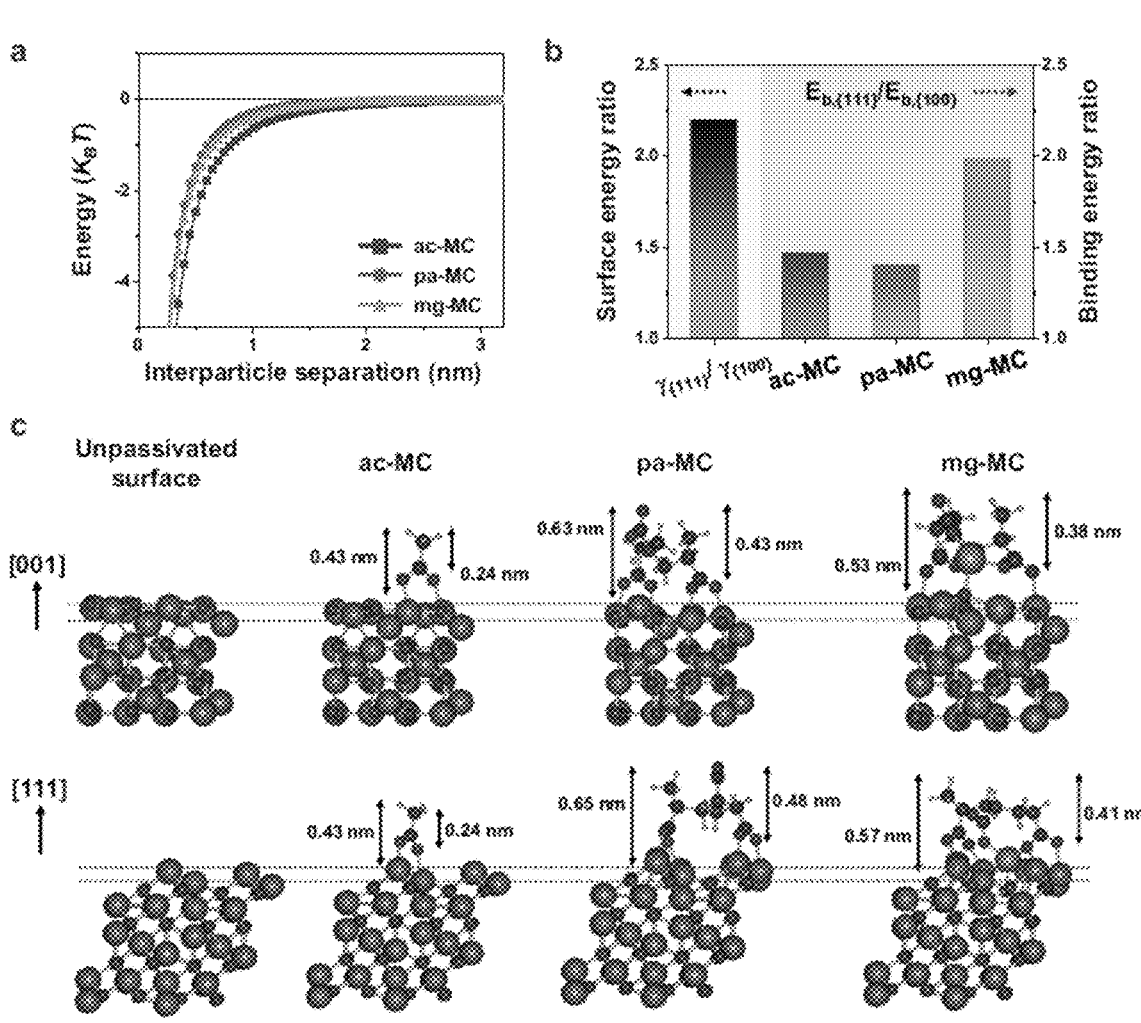

BRIEF DESCRIPTION OF THE DRAWINGS a to d of FIG. 1 show a TEM image (a), SAED pattern (b), a schematic diagram of a crystallization path of a mesocrystal (c), and an HR-TEM image (d) according to Experimental Example 1.

a to c of FIG. 2 show graphs related to the growth of mesocrystals according to Experimental Example 1, a of FIG. 2 shows a radial distribution profile graph of the SAED pattern in each reaction step, and b and c of FIG. 2 show size distribution graphs.

a to c of FIG. 3 show an image confirming the crystallographic direction and polymorphism for each ligand according to Experimental Example 2.

a to c of FIG. 4 are graphs showing an orientation factor (a), a size value (b), and a size distribution (c) according to Experimental Example 2, respectively.

a to c of FIG. 5 show an HR-TEM image and an FFT pattern image for each ligand according to Experimental Example 3.

a to e of FIG. 6 are views showing the magnetic properties according to Experimental Example 4, in which a of FIG. 6 shows a residual magnetization ($M_s$) graph, b and c of FIG. 6 show a magnetic coercivity ($H_c$) graph, d of FIG. 6 shows an image showing the effect of magnetic interaction, and e of FIG. 6 shows a BF-TEM image of the 1-D nanochain for ac-MC.

a of FIG. 7 is a graph showing the DLVO theory, b of FIG. 7 is a graph showing the surface energy and binding energy ratio, and c of FIG. 7 shows a BNC structure image confirmed using the density functional theory (DFT) for each ligand.

DETAILED DESCRIPTION OF EXEMPLARY EMBODIMENTS

Hereinafter, the present invention will be described in more detail.

Meanwhile, each description and embodiment disclosed herein may also be applied to other descriptions and embodiments. That is, all combinations of the various elements disclosed herein are within the scope of the present invention. In addition, it cannot be said that the scope of the present invention is limited by the specific descriptions described below.

When a part is said to "include" a component, this means that other components may be further included, not excluded, unless specifically stated to the contrary.

The present invention provides a method of controlling the arrangement of building block nanocrystals in iron oxide mesocrystals by controlling the type of surface ligand, the method including mixing an iron ion precursor and a surface ligand.

In the present invention, a "mesocrystal" refers to a structure in which small building block nanocrystals are aggregated, and may exhibit new collective properties that do not appear in individual building block nanocrystals. In the present invention, building block nanocrystals are formed from an iron ion precursor and a surface ligand, and while the arrangement of the building block nanocrystals is controlled, mesocrystals can be prepared through an oriented attachment process.

In the present invention, a "building block nanocrystal" is also referred to as a unit crystal or BNC, and refers to a basic unit for forming a mesocrystal.

According to the present invention, building block nanocrystals are assembled by an oriented attachment process to form a mesocrystal, in which the surface ligand used can be controlled to control the crystallographic arrangement during the oriented attachment process and thus control the magnetic properties.

In the present invention, the iron oxide of the iron oxide mesocrystal may include iron oxide in the form of ferrite doped with other metals (for example, $CO^{2+}$, $Ni^{2+}$, $Zn^{2+}$, $Mg^{2+}$, $Mn^{2+}$) in addition to iron. the iron oxide may be one or more selected from the group consisting of $Fe_2O_3$, $Fe_3O_4$, $CoFe_2O_4$, $NiFe_2O_4$, $ZnFe_2O_4$, $MgFe_2O_4$ and $MnFe_2O_4$, and preferably $Fe_3O_4$.

In the present invention, the surface ligand is a ligand capable of coordinating a single layer to the surface of the iron oxide building block nanocrystal, and may serve to control the arrangement of the building block nanocrystals in the mesocrystal in which the building block nanocrystals are assembled in the present invention.

In one embodiment, the type of iron ion precursor is not particularly limited, and may be, for example, iron chloride hexahydrate ($FeCl_3.6H_2O$).

In one embodiment, the present invention can control the arrangement of the building block nanocrystal by controlling the type of surface ligand, wherein various types of surface ligand can be used. In particular, in the present invention, the surface ligand that can be controlled is one or more selected from the group consisting of an acetate-based compound, a polyacrylate-based compound, a polymethacrylic acid-based compound, a polymaleic acid-based compound, a poly(acrylic acid-co-maleic acid)-based compound and a compound in which a metal cation is adsorbed to the polyacrylate-based compound, the polymethacrylic acid-based compound, the polymaleic acid-based compound or the poly(acrylic acid-co-maleic acid)-based compound.

The acetate-based compound is a surface ligand, and may serve as a source of hydroxide ions of iron oxide, and may be one or more selected from the group consisting of sodium acetate, potassium acetate, and ammonium acetate.

The polymethacrylate-based compound and the polyacrylate-based compound may be one or more selected from the group consisting of polymethacrylic acid, poly(acrylic acid), and alkali salts thereof, respectively. Here, the polymethacrylate-based compound and the polyacrylate-based compound pound may be formed by polymerization of an acetate-based compound and an acrylate-based compound or a methacrylate-based compound, respectively. Specifically, a polyacrylate-based compound or polymethacrylate-based compound was prepared by mixing an acrylate-based compound or a methacrylate-based compound with an acetate-based compound and polymerizing the compounds at a slow heating rate, and at the same time, the polyacrylate-based compound or the polymethacrylate-based compound can be coordinated at the Fe position of the building block nanocrystal surface.

The polymaleic acid-based compound may be one or more selected from the group consisting of polymaleic acid and a polymaleic acid alkali salt.

The poly(acrylic acid-co-maleic acid)-based compound may be in the form of a copolymer of acrylic acid or an acrylate salt; and maleic acid or a maleate salt.

A compound in which a metal cation is adsorbed to a polyacrylate-based compound, a polymethacrylic acid-based compound, polymaleic acid-based compound or a poly(acrylic acid-co-maleic acid)-based compound can be produced in the same manner as the polyacrylate-based compound, the polymethacrylic acid-based compound, the polymaleic acid-based compound or the poly(acrylic acid-co-maleic anhydride)-based compound through a step in which a metal cation precursor is injected into the reaction mixture during production and reacted.

Here, the adsorption of metal cations may mean that the metal cations are adsorbed by ionic bonding or coordinate bonding to the polyacrylate-based compound, polymethacrylic acid-based compound, polymaleic acid-based compound or poly(acrylic acid-co-maleic acid)-based compound.

The metal cation precursor may be a metal chloride or a hydrate thereof, but is not limited thereto. Here, the metal cation may be one or more selected from the group consisting of $Mg^{2+}$, $Fe^{2+}$, $Zn^{2+}$, $Co^{2+}$, $Ni^{2+}$, $Mn^{2+}$, $Cd^{2+}$, $Cr^{2+}$ and $Cu^{2+}$, and preferably $Mg^{2+}$. Most preferably, the metal cation precursor may be $MgCl_2.6H_2O$.

When the surface ligand according to the present invention is used, the building block nanocrystals may be arranged in the same crystallographic direction, may be arranged with slight misalignment, or may be arranged randomly. When they are arranged in the same direction, they exhibit relatively strong magnetism, and thus can be effectively applied to self thermotherapy, magnetic memories, or magnetic actuators. Conversely, when building block nanocrystals are randomly arranged, the building block nanocrystals exhibit superparamagnetic properties with weak interactions, so that they can be effectively applied to the fields of target drug delivery, magnetic separation of biomarkers, where magnetic properties can be utilized without the occurrence of magnetic aggregation between particles.

In the present invention, an iron oxide mesocrystal may be prepared by a mixing reaction of an iron ion precursor and a hydroxide ion precursor.

The mixing of the iron ion precursor and the surface ligand may be a step of mixing a solution including an iron ion precursor, a hydroxide ion precursor, and a solvent; and a solution including a surface ligand and a solvent.

In one embodiment, the hydroxide ion precursor may be one or more of $H_2O$ and an acetate-based compound.

In one embodiment, the solvent may serve not only as a solvent but also as a reducing agent. The type of solvent is not particularly limited, and may be, for example, $H_2O$, or an alkylene glycol, specifically, $H_2O$, ethylene glycol, diethylene glycol, triethylene glycol or tetraethylene glycol.

The solvents of the two solutions may be the same or different from each other. The solvent of the iron ion precursor solution may be $H_2O$ as a first solvent, and the solvent of the surface ligand solution may be an alkylene glycol, particularly ethylene glycol as a second solvent.

In one embodiment, the molar ratio of the iron ion precursor and the first solvent may be 1:10 to 1:1000, but is not limited thereto.

In one embodiment, the molar ratio of the iron ion precursor and the surface ligand may be 1000:1 to 1:100, preferably 1:2 to 1:4, more preferably 1:3, but, but not limited thereto.

In one embodiment, the molar ratio of the iron ion of the iron ion precursor and the metal cation of the metal cation precursor may be 1000:1 to 1:1000, preferably 1:0.2 to 1:0.7, but is not limited thereto.

In one embodiment, after mixing the iron ion precursor and the surface ligand, stirring at a temperature of 140 to 250° C. may be included. The stirring may be performed for 2 to 10 hours, but is not limited thereto.

In the present invention, the crystallographic arrangement of the building block nanocrystals in the mesocrystal may vary depending on the type of surface ligand. When the surface ligand is an acetate-based compound, the building block nanocrystals may be arranged in the same crystallographic direction in the mesocrystal, specifically, the average angle between adjacent building block nanocrystals may be in the range of 0 to 2 degrees, and the orientation factor may be 0.6 or more.

When the surface ligand is a polyacrylate-based compound, the building block nanocrystals may be arranged with a slight misalignment in the same crystallographic direction in the mesocrystal, specifically, the average angle between adjacent building block nanocrystals may be 2 to 10 degrees, and the orientation factor may be less than 0.6 and 0.2 or more.

When the surface ligand is a polymethacrylate-based compound, the arrangement between adjacent building block nanocrystals may be more disturbed than when the surface ligand is a polyacrylate-based compound, and thus a lower orientation factor may be exhibited.

When the surface ligand is a polymaleic acid-based compound, the degree of arrangement between adjacent building block nanocrystals may be higher than that of the polyacrylate-based compound, and thus an orientation factor is expected to be high.

When the surface ligand is a poly(acrylic acid-co-maleic acid)-based compound, it is expected that the average angle and orientation factor between the building block nanocrystals are similar to those of the polyacrylate-based compound.

In addition, when the surface ligand is a compound to which a metal cation is adsorbed, the degree of arrangement between building block nanocrystals may be lower than when a compound without a metal cation is used, and the building block nanocrystals may be randomly arranged in the mesocrystal. Specifically, the average angle between adjacent building block nanocrystals may be 10 degrees or more, and the orientation factor may be 0.2 or less.

The present invention also provides an iron oxide mesocrystal in which iron oxide building block nanocrystals having a controlled arrangement according to the present invention are assembled.

Specifically, the present invention can provide an iron oxide mesocrystal formed by assembling building block nanocrystals whose crystallographic arrangement is controlled according to the type of surface ligand.

The diameter of the mesocrystal may be 10 nm to 1 um, but is not limited thereto.

Here, for the surface ligand, the building block nanocrystal, and the iron ion precursor, the above description applies mutatis mutandis.

The present invention also provides a method of preparing an iron oxide mesocrystal in which iron oxide building block nanocrystals having a controlled arrangement by controlling the types of surface ligand are assembled, the method including mixing an iron ion precursor and a surface ligand.

In one embodiment, the mixing step may be a step of mixing a solution including the iron ion precursor, the hydroxide ion precursor, and a solvent; and a solution including the surface ligand and a solvent.

Here, for the hydroxide ion precursor, the solvent, the surface ligand, and the iron ion precursor, the above description applies mutatis mutandis.

When the surface ligand is an acetate-based compound, the preparation method may include mixing a solution including an iron ion precursor and water and a solution including an acetate-based compound and an alkylene glycol, then raising the temperature and stirring at a temperature of 140 to 250° C. The temperature increase rate may be 6 to 15° C./min, and the stirring time may be 2 to 10 hours.

When an acetate-based compound is used, it is possible to prepare an iron oxide mesocrystal in which the building block nanocrystals have the same crystallographic direction in the mesocrystal, and prepare an iron oxide mesocrystal with an average angle between adjacent building block nanocrystals ranging from 0 to 2 degrees and an orientation factor of 0.6 or more.

When the surface ligand is a polyacrylate-based compound or a polymethacrylate-based compound, the preparation method may include mixing a solution including an iron ion precursor and water and a solution including an acetate-based compound, an acrylate-based compound or a methacrylate-based compound and an alkylene glycol, then raising the temperature and stirring at a temperature of 140 to 250° C. The temperature increase rate may be 0.5 to 6° C./min, and the stirring time may be 2 to 10 hours.

When a polyacrylate-based compound is used, it is possible to prepare an iron oxide mesocrystal with a slight misalignment in the same crystallographic direction, and prepare an iron oxide mesocrystal with an average angle between adjacent building block nanocrystals of 2 to 10 degrees and an orientation factor of less than 0.6 and 0.2 or more.

When a polymethacrylate-based compound is used, it is possible to prepare an iron oxide mesocrystal with slightly more misalignment in the same crystallographic direction, and prepare an iron oxide mesocrystal with an average angle between adjacent building block nanocrystals of 2 to 15 degrees and an orientation factor of less than 0.6 and 0.2 or more.

When the surface ligand is a polymaleic acid-based compound, the preparation method may include mixing a solution including an iron ion precursor and water and a solution including an acetate-based compound, a maleic acid compound and an alkylene glycol, then raising the temperature and stirring at a temperature of 140 to 250° C. The temperature increase rate may be 0.5 to 6° C./min, and the stirring time may be 2 to 10 hours.

When a polymaleic acid-based compound is used, it is possible to prepare an iron oxide mesocrystal in which the building block nanocrystals have the same crystallographic direction in the mesocrystals, and prepare an iron oxide mesocrystal with an average angle between adjacent building block nanocrystals ranging from 0 to 2 degrees and an orientation factor of at least 0.6.

When the surface ligand is a poly(acrylic acid-co-maleic acid)-based compound, the preparation method may include mixing a solution including an iron ion precursor and water and a solution including an acrylate-based compound, a maleic acid-based compound and an alkylene glycol, then raising the temperature and stirring at a temperature of 140 to 250° C. The temperature increase rate may be 0.5 to 6° C./min, and the stirring time may be 2 to 10 hours.

When a poly(acrylic acid-co-maleic acid)-based compound is used, it is possible to prepare an iron oxide mesocrystal with a slight misalignment in the same crystallographic direction, and prepare an iron oxide mesocrystal with an average angle between adjacent building block nanocrystals of 2 to 10 degrees and an orientation factor of less than 0.6 and 0.2 or more.

When the surface ligand is a compound in which a metal cation is adsorbed to a polyacrylate-based compound, a polymethacrylate-based compound, a polymaleic acid-based compound, or a poly(acrylic acid-co-maleic acid)-based compound, the preparation of each compound may further include adding a solution including water and a metal cation precursor.

When a compound having metal cations adsorbed thereto is used, an iron oxide mesocrystal in which building block nanocrystals are randomly arranged can be prepared.

Specifically, in the case of using a polyacrylate-based compound to which a metal cation is adsorbed, a polymaleic acid-based compound to which a metal cation is adsorbed, and a poly(acrylic acid-co-maleic acid)-based compound to which a metal cation is adsorbed, it is possible to prepare iron oxide mesocrystals in which the average angle between adjacent building block nanocrystals is 10 degrees or more and the orientation factor is 0.2 or less.

In the case of using a polymethacrylate-based compound to which a metal cation is adsorbed, it is possible to prepare an iron oxide mesocrystal in which the average angle between adjacent building block nanocrystals is 15 degrees or more and the orientation factor is 0.2 or less.

Advantages and features of the present invention and methods of achieving them will become apparent with reference to the embodiments described below in detail. However, the present invention is not limited to the embodiments disclosed below and may be embodied in various different forms, and the embodiments merely serve to complete the disclosure of the present invention and to fully inform the scope of the invention to those skilled in the art to which the invention pertains, which is defined only by the spirit of the claims.

EXAMPLES

In this experiment, the $Fe_3O_4$ crystallization process over time was observed, and the type of surface ligand was differently set during the oriented attachment process of the mesocrystal to confirm the control of the arrangement of the building block nanocrystals in the mesocrystal, the magnetic properties, the surface energy and binding energy. Specifically, it is as follows.

PREPARATION EXAMPLE 1. PREPARATION OF MESOCRYSTAL USING ACETATE

Solution 1 was prepared by mixing 2 mmol of $FeCl_3.6H_2O$ and 150 mmol of $H_2O$, and solution 2 was prepared by mixing 6 mmol of NaOAC and 50 mL of ethylene glycol. These solutions were mixed, heated at a heating rate of 10° C./min, and refluxed at 200° C. for 3.5 hours. Here, since NaOAC was used as the $OH^-$ source, acetate was attached to the surface of the building block nanocrystal (BNC) without additional additives. The mesocrystal prepared in this way is hereinafter also referred to as 'ac-MC'.

Preparation Example 2. Preparation of Mesocrystal Using Polyacrylate Ligand

Solution 1 was prepared by mixing 2 mmol of $FeCl_3.6H_2O$ and 150 mmol of $H_2O$, and solution 2 was prepared by mixing 6 mmol of NaOAC, 0.5 mmol of NaAc and 50 mL of ethylene glycol. These solutions were mixed and heated to 200° C. at a heating rate of 2° C./min and refluxed at 200° C. for 3.5 hours. Here, by the addition of NaAc to the initial reaction solution 2 and a slow heating rate, acrylate molecules were polymerized into polyacrylate and coordinated at Fe sites on the BNC surface. The mesocrystal prepared in this way is hereinafter also referred to as 'paa-MC'.

Preparation Example 3. Preparation of Mesocrystal Using $Mg^{2+}$ Adsorption-Polyacrylate Ligand Meanwhile, in order to adsorb $Mg^{2+}$ to the polyacrylate-grafted surface in the preparation of a mesocrystal using a polyacrylate ligand according to Preparation Example 2, when the temperature reached 200° C., 1 mmol of $MgCl_2.6H_2O$ dissolved in 10 mmol of $H_2O$ was injected into the reaction mixture. The mesocrystal prepared in this way is hereinafter also referred to as 'mg-MC'.

Experimental Example 1. Confirmation of Crystallization of $Fe_3O_4$ Mesocrystal Through OA A mesocrystal was prepared according to Preparation Example 1, and the crystallization process was observed through ex situ-TEM, and the results are shown in a to d of FIG. 1.

From the TEM image of a of FIG. 1, it was confirmed that during the growth of $Fe_3O_4$, the ferric oxyhydroxide intermediate was consumed and converted to iron oxide in stages. In addition, c of FIG. 1 is a schematic diagram showing that BNC formation, oriented attachment (OA), and the generation of mesocrystals proceed as the reaction proceeds.

b of FIG. 1 and a of FIG. 2 show graphs of SAED patterns and radial distribution profiles over time, respectively.

As shown in b of FIG. 1 and a of FIG. 2, when t=0.5 h, when the crystallization reaction starts, a wide ring diffraction pattern appeared at d-spacings of 0.265 and 0.153 nm, which shows that a poor crystalline ferric oxyhydroxide intermediate of short range order is formed.

b and c of FIG. 2 show graphs of the size distribution of $Fe_3O_4$ over time.

As shown in b and c of FIG. 2, after t=1.5 hours, a diffraction spot corresponding to $Fe_3O_4$ gradually appeared along with the main peak of the $Fe_3O_4$ (311) crystal plane at a d-spacing of 0.253 nm. By t=3.5 h, the intermediate was completely consumed, and $Fe_3O_4$ mesocrystals were grown with a uniform size of 153±11 nm.

The diameter distribution of $Fe_3O_4$ mesocrystals formed in the initial intermediate stage had a wide distribution, but the distribution gradually narrowed as the reaction time increased (b of FIG. 2). It can be seen that the average diameter of $Fe_3O_4$ mesocrystals increased with the growth of crystals through oriented attachment (OA).

The polymorphism of ferric oxyhydroxide as an intermediate significantly influenced the crystallization mechanism of $Fe_3O_4$ mesocrystals. d of FIG. 1 shows a high resolution (HR) TEM image of the mesocrystal and the intermediate at t=1.5 h. The FFT pattern (region 1) of the $Fe_3O_4$ mesocrystal including a small set of BNCs shows a spot diffraction pattern, indicating that the BNCs have almost the same orientation. On the other hand, it can be seen that the polycrystalline ring pattern (region 2) in the periphery of the nanogranular mesocrystal is due to the random orientation of $Fe_3O_4$ BNCs formed in the intermediate, and the mesocrystalline structure is formed by assembly through colloidal aggregation of BNCs.

Experimental Example 2. Confirmation of the Crystallographic Arrangement of BNC During OA Process According to Experimental Example 2, the polymorphism and crystallographic arrangement of mesocrystals according to different surface ligands were confirmed. a to c of FIG. 3 show BF-TEM, SAED, and DF-TEM images of each $Fe_3O_4$ mesocrystal.

As can be seen in a of FIG. 3, in the case of the acetate-coordinated mesocrystal (ac-MC), BNCs were attached in the same crystallographic direction, thereby generating a diffraction spot pattern like a single crystal.

As can be seen in b of FIG. 3, in the case of the polyacrylate-coordinated mesocrystal (paa-MC), the diffraction spot pattern was stretched due to slight misalignment between BNCs.

As can be seen in c of FIG. 3, in the case of the $Mg^{2+}$-adsorbed polyacrylate-coordinated mesocrystal (mg-MC), BNCs did not exhibit arrangement regularity, thereby forming a polycrystalline ring pattern in a random direction.

a to c of FIG. 4 show the results of confirming the degree of crystallographic arrangement of BNCs in the mesocrystal for each ligand.

a of FIG. 4 shows the orientation factor derived from the azimuthal profile of single mesocrystal diffraction on the (311) plane. The orientation factor refers to the degree of BNC tiling during the oriented attachment process, and it can be confirmed that polyacrylate is grafted onto the BNC surface and the orientation factor is lowered by $Mg^{2+}$ ion implantation.

As shown in b of FIG. 4, in all samples, the size of BNCs measured by TEM was about 4 nm in a similar form regardless of the ligand type, but it can be confirmed that the particle size of crystals measured by XRD is reduced by random arrangement by polyacrylate and $Mg^{2+}$ ions.

In addition, the $Fe_3O_4$ mesocrystals prepared by the above Preparation Examples were uniformly synthesized with similar sizes. Specifically, as shown in c of FIG. 4, the size was 153±11 nm for the acetate-coordinated mesocrystal (ac-MC), 153±16 nm for the polyacrylate-coordinated mesocrystal (paa-MC), and 140.8±20 nm for the $Mg^{2+}$-adsorbed polyacrylate-coordinated mesocrystal (mg-MC).

Meanwhile, BNC tiling was observed along the same [001] zone axis according to each ligand, and the resulting HR-TEM image and FFT pattern are shown in a to c of FIG. 5.

As shown in a of FIG. 5, in ac-MC, eight {111}-to-{111} and four {100}-to-{100} facet-to-facet were formed per BNC, and the {111} facet was minimized and packed in a consistent orientation.

As shown in b of FIG. 5, in paa-MC, it exhibited the same tiling rule as ac-MC, but adjacent BNCs were tilted by about 5°, resulting in stretched points in the FFT pattern. As shown in c of FIG. 5, upon addition of $Mg^{2+}$, adjacent BNCs were randomly aggregated with a tilt angle of 29° and it was difficult to find a consistent tiling rule.

In addition, as shown in c of FIG. 2, in the case of ac-MC, after a reaction time of 3.5 hours out of 10 hours, there was no further growth and coarsening between the BNCs occurred, resulting in the nanogranular morphology being disrupted and the formation of a larger granular structure. In addition, coarsening proceeded along perfectly arranged regions and the crystallite size measured by XRD was maintained during coarsening.

Experimental Example 3. Mesocrystals According to BNC Arrangement and their Magnetic Properties Residual magnetization ($M_s$), blocking temperature ($T_B$) and magnetic coercivity ($H_e$) according to each ligand were measured, and the results are shown in Table 1 and FIGS. 6A to 6C.

TABLE 1

|  | ac-MC | pa-MC | mg-MC |
| --- | --- | --- | --- |
| $M_s$ ($Am^2$/kg) | 87.7 | 82.0 | 74.4 |
| $H_c$ (kA/m) | 1.88 | 0.77 | 0.47 |
| $M_r$ ($Am^2$/kg) | 2.83 | 1.29 | 0.74 |
| $T_B$ (K) | >400 | 325.3 | 215.6 |

The crystallographic arrangement of BNCs in mesocrystals can affect the magnetic coupling between BNCs to cause changes in the collective magnetic properties of mesocrystals, but as shown in Table 1, the misalignment of BNCs can reduce residual magnetization ($M_s$), the blocking temperature ($T_B$), and magnetic coercivity (Hc).

That is, ac-MC, in which BNCs are arranged in the same direction, has a magnetic moment of grains coupled to one another through interactions on the order of a few nanometers, and can have strong anisotropy and exchange interactions, resulting in an increase in $M_s$, $T_B$ and $H_c$. However, in the case of mg-MC, mesocrystals had disordered grains of less than 10 nm due to BNC misalignment, and the anisotropy was changed depending on the position, resulting in random anisotropy, reduction of exchange coupling, and reduction of $M_s$, $T_B$ and $H_c$.

In addition, as shown in a of FIG. 6, in the case of mg-MC, the random BNC arrangement exhibited superparamagnetic behavior at $T_B$=216K.

Meanwhile, to investigate the interaction between mesocrystals according to the BNC arrangement, mesocrystals were arranged in a one-dimensional nanochain in an external magnetic field of 160 kA/m, and the results are shown in e of FIG. 6. From e of FIG. 6, when prepared with ac-MC, due to the interaction anisotropy, a straight line along the <111> axis of the magnetic crystal anisotropy and it was found that the uniaxial anisotropy of the nanochains can be induced by the magnetostatic coupling between the mesocrystals. In contrast, mesocrystals with misarranged BNCs did not show a characteristic arrangement.

In addition, by changing the angle between the chain axis and the magnetic field, the angular dependence of the Hc behavior in the nanochain was investigated, and the results are shown in c of FIG. 6. The coercivity of the magnetic chains arranged in the <111> direction showed a clear angular dependence with a minimum value at θ=0° and a maximum value at θ=90°.

Finally, from d of FIG. 6, the nanochain by mg-MC shows isotropic magnetic coercivity for all field angles, confirming that the magnetostatic interaction is not strong enough to induce anisotropy along the axis of the nanochain. Therefore, it can be seen that the nanochain by mg-MC behaves like an isolated superparamagnetic mesocrystal.

Experimental Example 4. Confirmation of Surface Energy and Ligand Binding Energy The driving force leading to the assembly of colloidal nanocrystals can generally be described by inter-particle interactions using the Derjaguin-Landau-Verwey-Overbeek theory (DLVO theory), although the DLVO theory did not clearly identify the surface ligand-induced changes in the BNC arrangement (see a of FIG. 7).

Accordingly, the density functional theory (DFT) was used to investigate the surface energy and ligand binding energy considering the ligand structure of {100}, {110} and {111} planes in order to better understand the factors controlling the arrangement changes induced by different ligands. The results are shown in FIGS. 7B and 7C, and Table 2.

TABLE 2

| Facet | Surface energy (eV · nm$^{-2}$) | Binding energy (eV per molecule) | | |
|---|---|---|---|---|
| | | ac-MC | paa-MC | mg-MC |
| {100} | 0.51 | 3.48 | 8.19 | 7.49 |
| {110} | 4.24 | 3.40 | 23.64 | 11.81 |
| {111} | 1.12 | 5.11 | 11.49 | 14.86 |

As shown in Table 2 above, the surface energies of unpassivated $Fe_3O_4$ for {100}, {110} and {111} were 0.51, 4.24 and 1.12 eV/nm², respectively. Since the binding affinity for the {111} plane of all ligands is more dominant than that for the {100} plane, which passivates the dangling bond, anisotropic surface energy (γ(111)–γ(100)>0) can be mitigated.

b of FIG. 7 shows a graph of binding energy and surface energy ratio. For ac-MC, the binding energy ratio of the {111} and {100} planes is 1.46 ($E_b$,(111)/$E_b$,(100)), which was not sufficient to reduce the surface energy anisotropy, resulting in crystallographically arranged BNCs, which minimizes surface energy by removing {111} planes rather than {100} planes.

In the case of paa-MC, the ratio is 225±1.40 ($E_b$,(111)/$E_b$,(100)), but the binding energy for all planes increases significantly, so that the regularity of the tiling rule like ac-MC can be maintained. In addition, as shown in c of FIG. 7, the carboxylate of the surface ligand coordinated by bidentate bridging at each BNC plane distorts the positions of Fe and O atoms and a zigzag shape was created at the polyacrylate graft surface, resulting in consistency in inter-plane attachment and a slight reduction in the orientation factor in TEM observation.

In the case of mg-MC, $Mg^{2+}$ ions can link the free carboxylate of the unbound polyacrylate with 0 on the $Fe_3O_4$ surface, which can lead to a decrease in the electrokinetic potential. The binding energy ratio of the {111} and {100} planes with the distortion phenomenon due to the induction of $Mg^{2+}$ ions in the acrylate coordination configuration of $Fe_3O_4$ was 1.98($E_b$,(111)/$E_b$,(100)), which increased the binding energy difference, resulting in a reduction of the anisotropic surface energy in the tiling rule of BNC attachment (b of FIG. 7).

These results indicate that the order-disorder transition in the BNC arrangement can be induced due to the surface ligand coordination, which can lead to changes in anisotropic surface energy and surface distortion.

What is claimed is:

1. A method of controlling the arrangement of building block nanocrystals in an iron oxide mesocrystal by controlling the type of surface ligand, the method comprising mixing an iron ion precursor and a surface ligand, wherein the surface ligand is a polyacrylate-based compound to which a metal cation is adsorbed and the building block nanocrystals form polycrystalline ring pattern in a random direction.

2. The method of claim 1, wherein the iron oxide of the iron oxide mesocrystal is one or more selected from the group consisting of $Fe_2O_3$, $Fe_3O_4$, $CoFe_2O_4$, $NiFe_2O_4$, $ZnFe_2O_4$, $MgFe_2O_4$ and $MnFe_2O_4$.

3. The method of claim 1, wherein the mixing molar ratio of the iron ion precursor and the surface ligand is 1000:1 to 1:1000.

4. The method of claim 1, wherein the mixing step comprises mixing a solution including the iron ion precursor, a hydroxide ion precursor, and a solvent; and a solution including the surface ligand and a solvent.

5. The method of claim 1, wherein the metal cation is one or more selected from the group consisting of $Mg^{2+}$, $Fe^{2+}$, $Zn^{2+}$, $Co^{2+}$, $Ni^{2+}$, $Mn^{2+}$, $Cd^{2+}$, $Cr^{2+}$ and $Cu^{2+}$.

6. An iron oxide mesocrystal in which iron oxide building block nanocrystals whose arrangement is controlled according to claim 1 are assembled.

* * * * *